United States Patent
Schwartz et al.

(10) Patent No.: US 9,280,754 B1
(45) Date of Patent: Mar. 8, 2016

(54) METHOD AND APPARATUS FOR REAL TIME AUTOMATED INTELLIGENT SELF-SCHEDULING

(71) Applicant: WorkFlex Solutions, LLC, Cincinnati, OH (US)

(72) Inventors: Larry S. Schwartz, Cincinnati, OH (US); Mitesh D. Desai, Plano, TX (US)

(73) Assignee: WorkFlex Solutions, LLC, Cincinnati, OH (US)

( * ) Notice: Subject to any disclaimer, the term of this patent is extended or adjusted under 35 U.S.C. 154(b) by 0 days.

(21) Appl. No.: 14/170,782

(22) Filed: Feb. 3, 2014

Related U.S. Application Data

(63) Continuation-in-part of application No. 13/136,724, filed on Aug. 9, 2011.

(60) Provisional application No. 61/401,244, filed on Aug. 10, 2010.

(51) Int. Cl.
  *G06Q 10/00* (2012.01)
  *G06Q 10/06* (2012.01)

(52) U.S. Cl.
  CPC .............................. *G06Q 10/063116* (2013.01)

(58) Field of Classification Search
  CPC .................... G06Q 10/00–50/00; G06Q 90/00; G06Q 99/00; G06F 1/00; G06F 3/00; G06F 5/00; G06F 7/00–9/00; G06F 11/00–13/00; G06F 15/00; G06F 17/00; G06F 19/00; G06F 21/00
  USPC ...................................................... 705/11–44
  See application file for complete search history.

(56) References Cited

U.S. PATENT DOCUMENTS

| | | | | |
|---|---|---|---|---|
| 5,907,829 | A | * | 5/1999 | Kida ............................. 705/7.16 |
| 6,192,346 | B1 | * | 2/2001 | Green ............. G06Q 10/063116 705/7.16 |
| 6,301,573 | B1 | | 10/2001 | McIlwaine et al. |
| 6,587,831 | B1 | * | 7/2003 | O'Brien ........................ 705/7.16 |
| 6,628,777 | B1 | | 9/2003 | McIlwaine et al. |
| 6,957,188 | B1 | * | 10/2005 | Dellevi et al. ................. 705/7.14 |
| 7,174,010 | B2 | * | 2/2007 | McIlwaine et al. ...... 379/265.01 |
| 7,499,869 | B2 | * | 3/2009 | Iknoian ......................... 705/7.16 |
| 7,962,356 | B2 | * | 6/2011 | Bollenbeck et al. .......... 705/7.13 |
| 8,219,430 | B1 | * | 7/2012 | Thompson et al. ........... 705/7.12 |
| 8,781,873 | B2 | * | 7/2014 | Purohit et al. ............... 705/7.18 |
| 8,788,308 | B1 | * | 7/2014 | Cox ............... G06Q 10/063116 705/7.13 |
| 2003/0086555 | A1 | * | 5/2003 | McIlwaine et al. ...... 379/265.02 |
| 2004/0010437 | A1 | * | 1/2004 | Kiran et al. ...................... 705/8 |
| 2005/0125278 | A1 | * | 6/2005 | Vajracharya et al. ............. 705/9 |

(Continued)

OTHER PUBLICATIONS

US Office Action, Non-Final, dated Dec. 20, 2012 for US. Appl. No. 13/136,724.

(Continued)

*Primary Examiner* — Alan S Miller
(74) *Attorney, Agent, or Firm* — Frost Brown Todd LLC

(57) ABSTRACT

A business can use an improved workforce management system which includes capabilities for supporting intraday dynamic staffing. This dynamic staffing can include identifying wages which should be offered to workers to induce them to meet the business' needs, based on, for example, historical information stored in a database. Systems which include dynamic intraday staffing can be run using remote servers and interfaces accessed through various types of devices, such as internet enabled personal computers.

17 Claims, 8 Drawing Sheets

(56) References Cited

U.S. PATENT DOCUMENTS

| | | | |
|---|---|---|---|
| 2005/0137925 A1* | 6/2005 | Lakritz et al. ..................... 705/8 |
| 2005/0175971 A1* | 8/2005 | Mcilwaine ............. G06Q 10/06 434/219 |
| 2005/0288987 A1* | 12/2005 | Sattler et al. ....................... 705/9 |
| 2006/0109975 A1* | 5/2006 | Judkins et al. ............ 379/265.02 |
| 2007/0127689 A1* | 6/2007 | McIlwaine et al. ....... 379/265.02 |
| 2007/0179830 A1* | 8/2007 | Iknoian .............................. 705/9 |
| 2007/0208604 A1* | 9/2007 | Purohit et al. ...................... 705/9 |
| 2008/0059277 A1* | 3/2008 | Medina .................. G06Q 10/06 705/7.14 |
| 2008/0059278 A1* | 3/2008 | Medina .................. G06Q 10/06 705/7.14 |
| 2008/0075268 A1* | 3/2008 | Medina ............... H04M 3/5175 379/265.06 |
| 2008/0147472 A1* | 6/2008 | Hitz .................................. 705/9 |
| 2009/0182611 A1* | 7/2009 | Iknoian ............................. 705/9 |
| 2010/0017251 A1* | 1/2010 | Rawle et al. ....................... 705/9 |

OTHER PUBLICATIONS

US Office Action, Final, dated Jun. 5, 2013 for U.S. Appl. No. 13/136,724.

US Office Action, Non-Final, dated Mar. 12, 2015 for U.S. Appl. No. 13/136,724.

US Office Action, Non-Final, dated May 6, 2015 for U.S. Appl. No. 14/599,053.

US Office Action, Final, dated Oct. 8, 2015 for U.S. Appl. No. 14/599,053.

US Office Action, Final, dated Oct. 30, 2015 for U.S. Appl. No. 14/599,053.

* cited by examiner

Figure 4

CALCULATED AGENT DEMAND

| | | Revenue Impact | OI Impact |
|---|---|---|---|
| Tech Support | 20 | 2,000.00 | 700.00 |
| Customer Service | 10 | 1,200.00 | 300.00 |
| Sales | 15 | 1,500.00 | 500.00 |

CALCULATED FLEXIBLE WAGE

| | Breakeven Rate | Maximum Calculated Rate | | | Offered Rate | Recovered OI($) | Recovered OI(%) |
|---|---|---|---|---|---|---|---|
| | | Breakeven Threshold | Basepay | Callout History | | | |
| Tech Support | $36.75/hr | $33.06/hr | $45.00/hr | $33.00/hr | $33.00/hr | 460.00 | 66% |
| Customer Service | $32.50/hr | $27.63/hr | $37.50/hr | $27.50/hr | $27.50/hr | 200.00 | 67% |
| Sales | $26.33/hr | $22.93/hr | $30.00/hr | $22.00/hr | $22.00/hr | 350.00 | 70% |

AGENT CALLOUT LIST

| Client/Program | First Name, Last Name | Contact Phone | Contact Mail | Proficiency(%) | Success Ratio(%) | # of Times Called |
|---|---|---|---|---|---|---|
| Tech Support | Carly Smith | 222-555-1414 | CarlySmith@test.com | 95 | 75 | 4 |
| Tech Support | Bharat Patel | 222-555-2323 | BharatPatel@test.com | 92 | 100 | 2 |
| Tech Support | Dale Hansen | 222-555-3232 | DaleHansen@test.com | 91 | 100 | 0 |
| Tech Support | Lila RILEY | 222-555-1602 | LilaRILEY@test.com | 90 | 75 | 4 |
| Tech Support | Darren McKnight | 222-555-4049 | DarrenMcKnight@test.com | 90 | 50 | 2 |
| Tech Support | Cat Stevens | 222-555-2020 | CatStevens@test.com | 89 | 67 | 3 |

Figure 5

| Change Your Schedule | Current Schedule Cannot Change | Current Schedule Eligible to Change from | Time Slots Available To Change to |
|---|---|---|---|

| Sunday | Monday | Tuesday | Wednesday | Thursday | Friday | Saturday |
|---|---|---|---|---|---|---|
| 09:00 | 09:00 | 09:00 | 09:00 | 09:00 | 09:00 | 09:00 |
| 09:30 | 09:30 | 09:30 | 09:30 | 09:30 | 09:30 | 09:30 |
| 10:00 | 10:00 | 10:00 | 10:00 | 10:00 | 10:00 | 10:00 |
| 10:30 | 10:30 | 10:30 | 10:30 | 10:30 | 10:30 | 10:30 |
| 11:00 | 11:00 | 11:00 | 11:00 | 11:00 | 11:00 | 11:00 |
| 11:30 | 11:30 | 11:30 | 11:30 | 11:30 | 11:30 | 11:30 |
| 12:00 | 12:00 | 12:00 | 12:00 | 12:00 | 12:00 | 12:00 |
| 12:30 | 12:30 | 12:30 | 12:30 | 12:30 | 12:30 | 12:30 |

METHOD AND APPARATUS FOR REAL TIME AUTOMATED INTELLIGENT SELF-SCHEDULING

CROSS REFERENCE TO RELATED APPLICATIONS

This application claims priority from, and is a continuation in part of, U.S. non-provisional patent application Ser. No. 13/136,724, filed Aug. 9, 2011, which itself claims priority from, and is a non-provisional of, U.S. Provisional Patent Application Ser. No. 61/401,244, which was filed on Aug. 10, 2010, each of which are hereby incorporated in their entirety by reference for all purposes.

BACKGROUND

To schedule large hourly workforces (for example call center agents), most companies utilize Workforce Management (WFM) software-based products that provide forecasting and scheduling capability. The forecasting capabilities typically utilize analytics against historical patterns of demand to predict future demand. An example of a typical WFM system architecture is shown in FIG. 1.

However, WFM systems have a limited ability to deal with situations where the actual demand or supply of agents differs from what has been forecast. For example, if the WFM system forecasts a demand of 200 agents for a given day, and schedules 200 agents accordingly, but the actual demand is 225 agents and only 175 show up to work, the system can do little to enable the company to adjust for the unexpected gap of 50 for that day, beyond offer reporting tools to track staffing level gaps.

Additionally, the processes used to change schedules by entities using traditional WFM systems are generally inefficient and can lead to sub-optimal results. For example, when an agent wants to have his or her schedule changed, he or she will generally be required to contact an administrator (or other individual with authority to make the change) and make a request. The administrator will then consider the agent's schedule and other factors that may be relevant in a given situation and decide whether to approve or deny the change. At best, this type of process will result in additional work for the administrator and wasted time and frustration for anyone waiting to learn if the request is approved or denied. Additionally, it will often result in a sub-optimal scheduling decision being made, since the administrator may not have all relevant data easily available when determining whether to approve the request and, even if all relevant data is easily available, may not have the time to do a complete analysis.

Accordingly, there is a need in the art for improved workforce management technology to deal with intraday staffing gaps and employee initiated change requests.

SUMMARY

The technology disclosed herein can be used for a variety of purposes, including addressing the lack of ability in current WFM products to adjust for intraday staffing gaps and divergences between actual demand during a shift and the demand projected when the schedule for that shift was created. This can be achieved, for example, by an intraday staffing system that dynamically generates an optimized agent callout list and wage offer based on business rules that have been preconfigured by the company. The disclosed technology can also be used to facilitate the submission and processing of requests for schedule changes, such as through a computer configured to generate a scheduling interface with information on potential changes, and to automatically approve or deny some or all of the changes requested through such an interface. Of course, as will be apparent to those of ordinary skill in the art in light of this disclosure, the disclosed technology is susceptible of other implementations, and so the example described above should be understood as being illustrative only, and not limiting.

BRIEF DESCRIPTION OF THE DRAWINGS

The drawings and detailed description which follow are intended to be merely illustrative and are not intended to limit the scope of the invention as contemplated by the inventors.

FIG. 4 depicts an exemplary input screen.

FIG. 5 depicts an exemplary output screen.

FIG. 8 depicts an interface which could be used to support worker initiated schedule changes.

FIG. 9 depicts an interface which a worker could use to fill in his or her work schedule.

DETAILED DESCRIPTION

Figure 1:
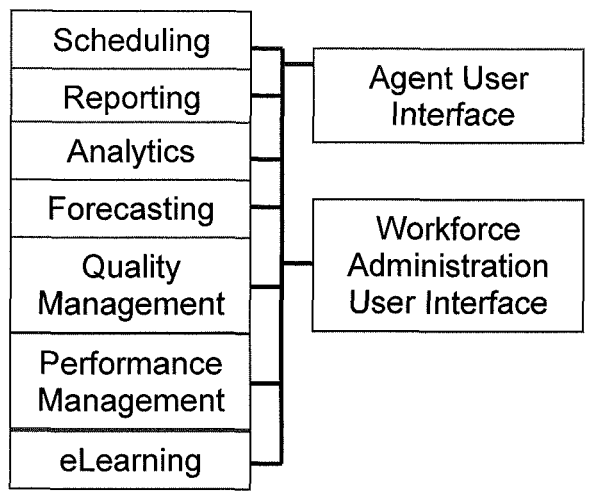
FIG. 1 depicts a typical WFM system architecture.
Figure 2:
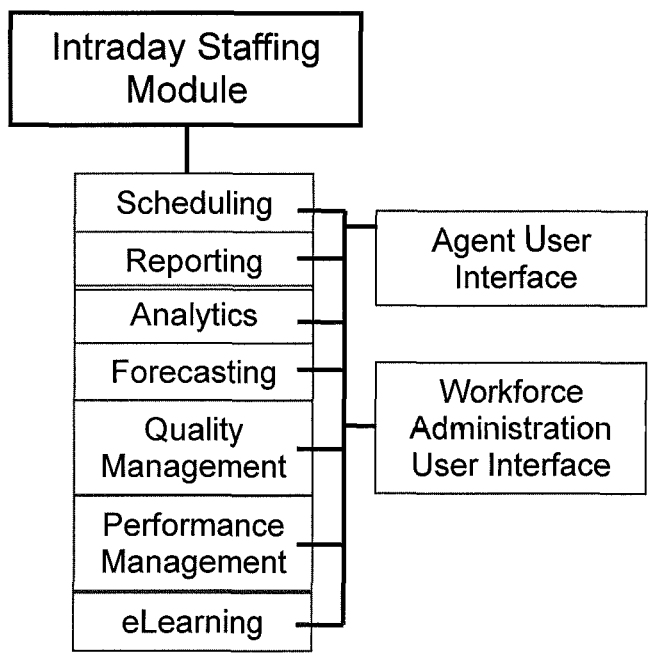
FIG. 2 depicts an exemplary high level enhanced WFM system architecture with intraday staffing engine.
Figure 7:
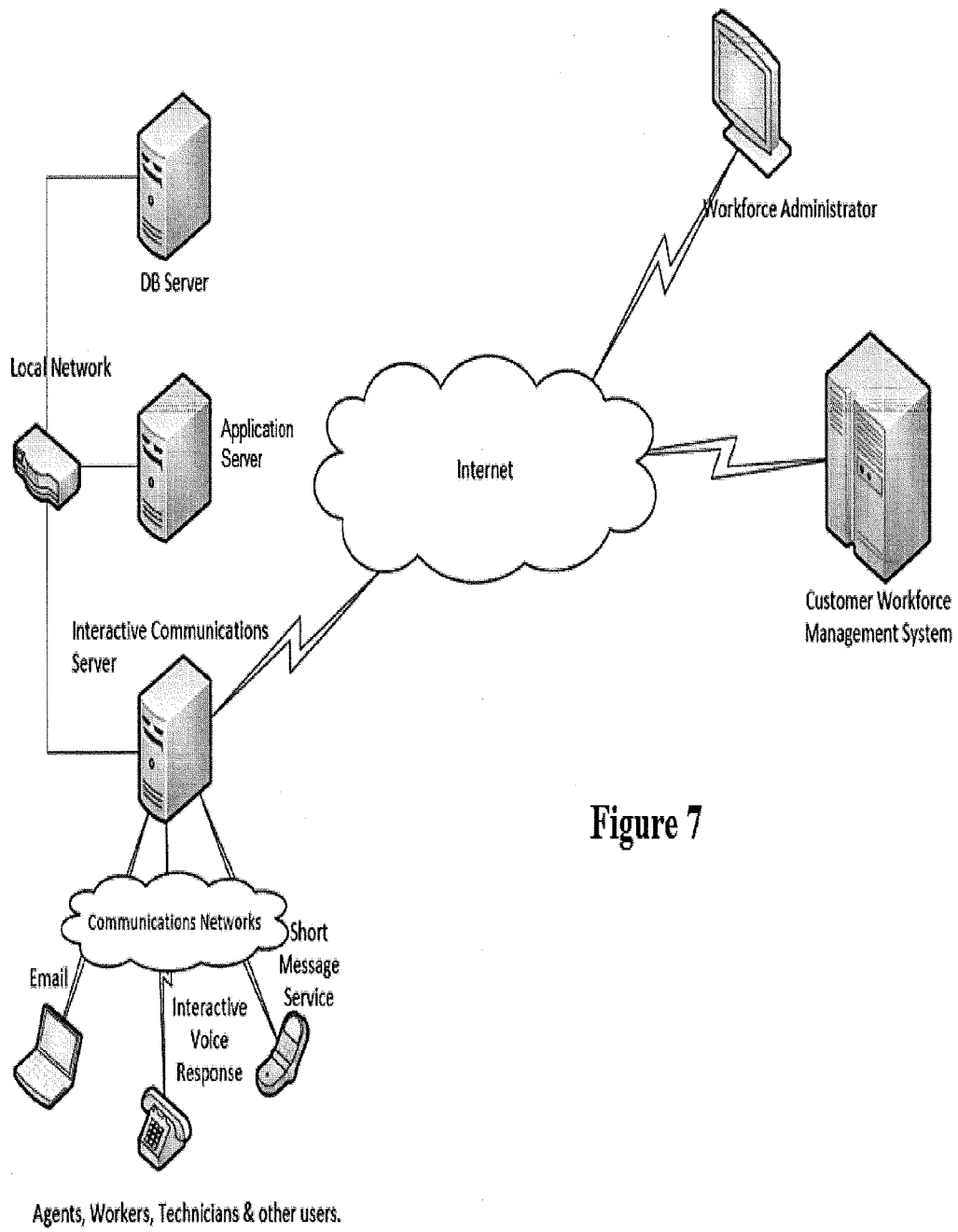
FIG. 7 depicts exemplary components which could be used in implementing the technology described herein.

Turning first to the figures, FIG. 2 depicts an exemplary high level enhanced WFM system architecture. As can be seen by comparison with the architecture shown in FIG. 1, the enhanced architecture differs from that typically available by the addition of an intraday staffing engine. Of course, it should be understood that the high level diagram of FIG. 2 is formatted for easy comparison with the typical architecture of FIG. 1, and that actual implementations would not necessarily share the structure shown in FIG. 2. As an example of this, consider the exemplary system architecture of FIG. 3, which provides an alternate approach to implementing the technology described herein. As will be apparent to one of ordinary skill in the art, such an architecture could be used with exemplary components such as shown in FIG. 7 to implement dynamic intraday scheduling.

Figure 3:
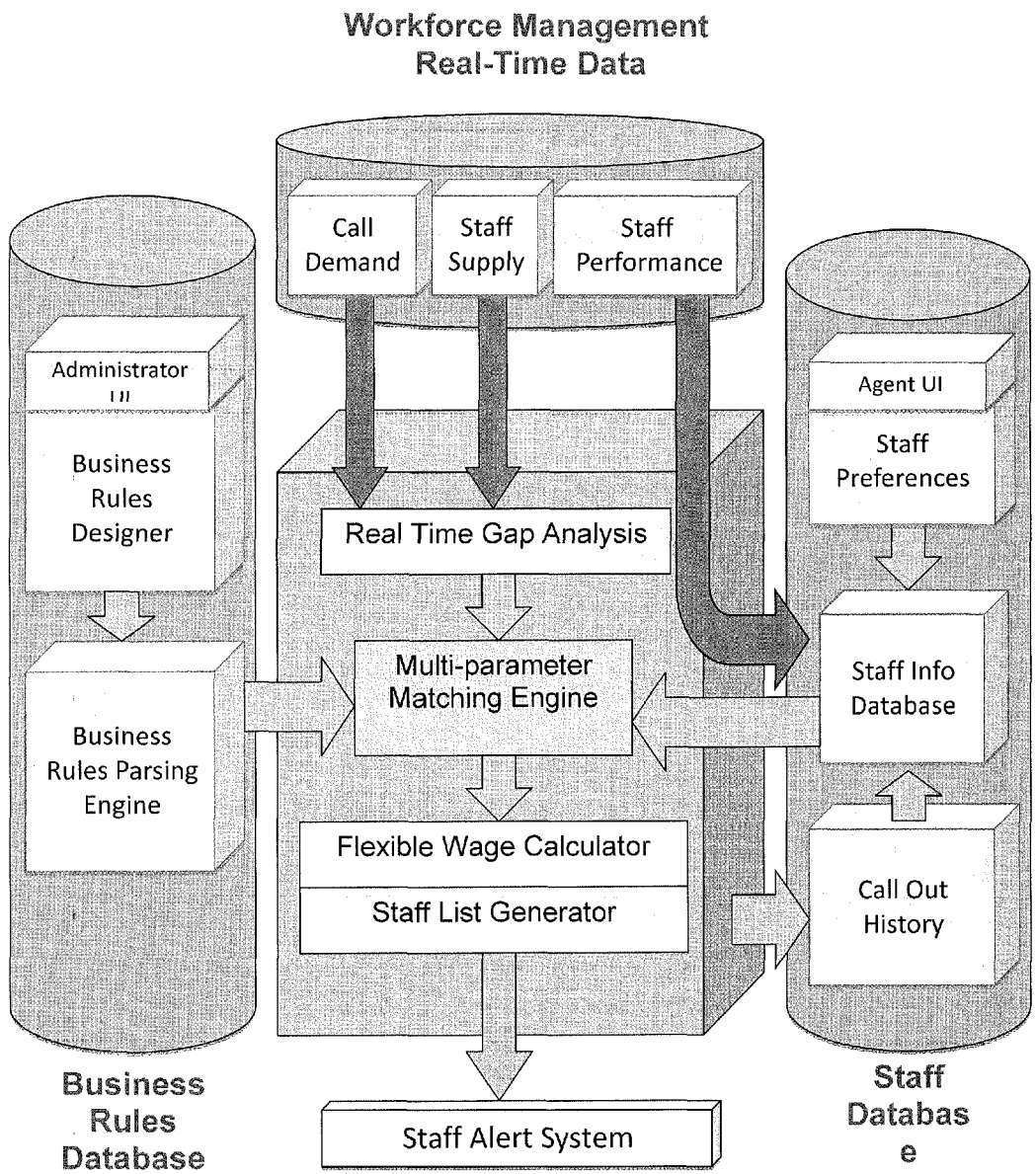
FIG. 3 depicts an exemplary system architecture which could be implemented using the disclosed technology.

As shown in the architecture of FIG. 3, the technology described herein could be used to implement in a system in which the heart of the system is a multi-parameter matching engine capable of processing and integrating feeds from a variety of sources. Such sources can include, for example:

Workforce Management Real-Time Data including Real Time Call Demand, Agent Supply, and Agent Performance information which can typically be extracted from the existing WFM system or telecom interface (e.g., PBX, ACD);

Business Rules Database that includes a business rules designer and business rules parsing engine that supports the aggregation of multiple predefined business rules; and Staff Database which contains staff specific information such as staff availability preferences, performance data and call out history (i.e., the acceptance rate of offers previously provided).

In some implementations, such a multi-parameter matching engine can use the real-time workforce management data to identify a staffing gap. It could then match this against rules that have been defined within the business rules database to determine what actions need to be taken (e.g., selection criteria for agents, and time-urgency of staffing needs) which would then be matched against the agent database to generate an optimized staff call out list and dynamic wage offer based on the criteria defined by the business rules database. This information could then be used by a staff alert system (e.g., email, voice-mail, mobile messaging) to contact the individuals and provide an offer to come for a previously unscheduled shift.

This allows dynamic calculation of a dynamic wage offering for intraday staffing, which is a functionality not previously known or available in the prior art. As an example, if the business rules database determines a time-urgency that requires 80% of offers to be accepted, the system will analyze previous acceptance rates at various staffing levels and generate a recommended wage level that has typically resulted in an 80% acceptance rate.

Figure 4:
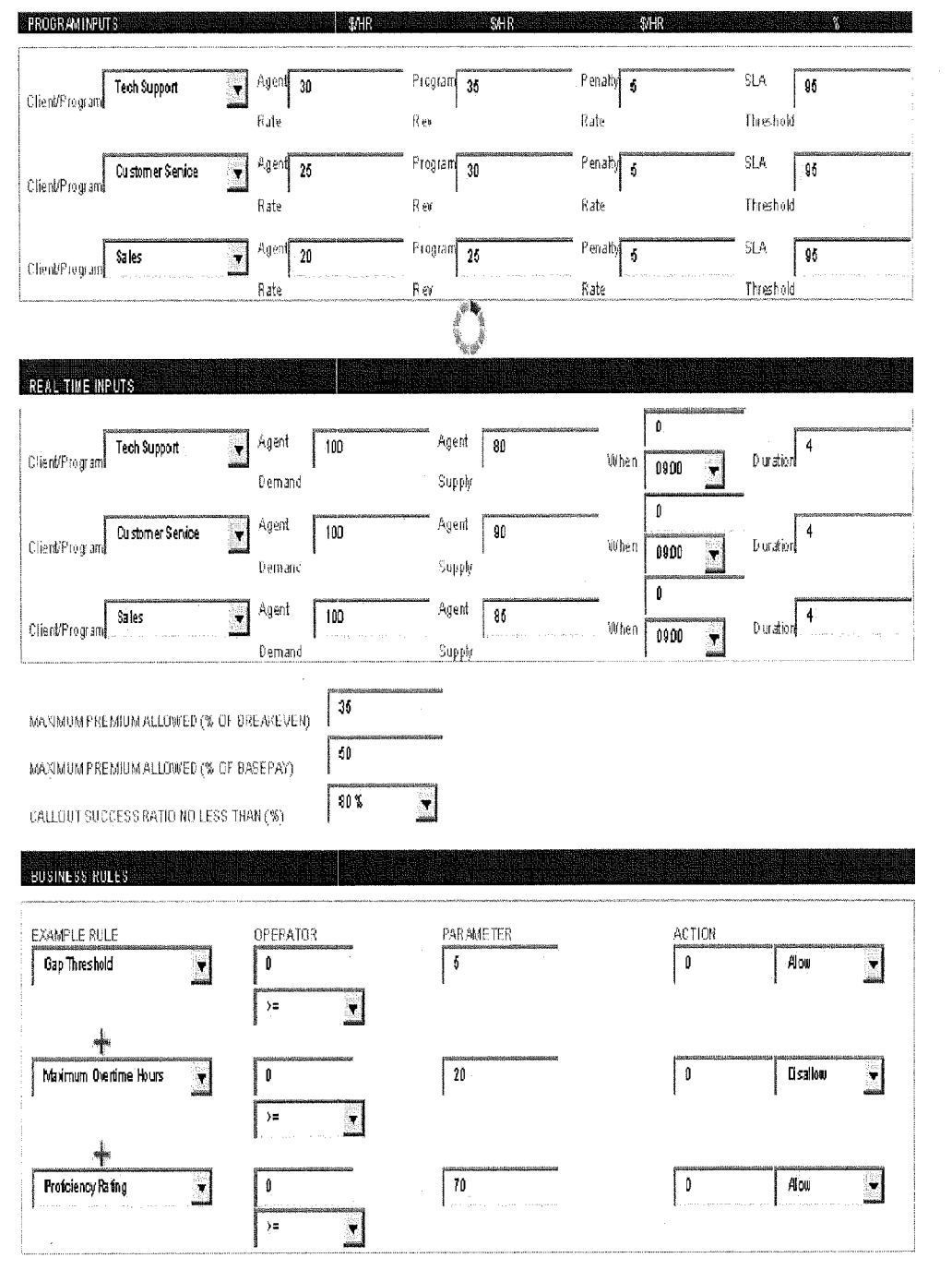

To illustrate how a system with an architecture such as shown in FIG. 3 could be used in practice, consider an implementation in which a back end system having an architecture such as shown in FIG. 3 is used to power a web accessible input screen such as shown in FIG. 4. In such interfaces, there could be a program input portion which enables input of information for various programs being supported, such as, in the case of FIG. 4, customer care, technical support and sales. For each program, information of the cost and revenue for each program can be input, including any internal performance compliance requirements and/or contractual service level agreements that may be in place. There could also be a real time input section, which could be provided by an existing workforce management system and could provide details on staff supply and demand for a particular time window. This part of the screen could also allow operators to specify the maximum staff wage premiums (or other types of incentives, such as paid time off or preferential treatment for future schedule modifications) they are willing to offer and the success rate they wish to achieve for "call outs". The system can be designed to use historical success rates and wages to dynamically calculate the wage (or other incentive) to be offered what will achieve the desired success rate. There could also be a business rules section which could allow users to create rules on how they would like to respond to various situations. An example of a rule might be to trigger a search for on call staff if the gap is greater than 5 and then to look for available staff with a proficiency rating of 70/100 or better, excluding staff that have worked over 20 overtime hours that week already.

Of course, it should be understood that the interface of FIG. 4, and the associated description, are both intended to be illustrative only, and should not be treated as limiting on the potential scope of any claims included in this or any related document. For example, in some implementations, rather than having various portions included in a single interface screen, a back end system could be used to power multiple screens, each of which would be dedicated to a particular type of input. Further, in some implementations, there might be screens in addition to, or as alternatives to, those illustrated in FIG. 4. As an example, consider the exemplary output screen illustrated in FIG. 5.

In some implementations, when a system detects a status that requires action based on the business rules (e.g., as defined in an input screen such as shown in FIG. 4), an alert can be set to a staffing information module with information such as:

A calculated agent demand, which can be presented in a section of a screen which shows the identified staffing gaps and potential revenue and operating income exposure based on information that has been provided to the system (e.g., on the input screen);

A flexible wage section, which can be presented in a section of a screen which shows any recommended variance to the standard base wage level based on rules provided on the input screen (e.g., call out success rate required); and An agent call out list, which can include names of individuals the system is recommending calling based on the business rules defined on the input screen (e.g., proficiency, previous call out success, overtime hours . . . ), and may also include how the system will contact them (e.g., SMS, voice-mail, email).

In a production environment, an administrator could approve a system recommendation (e.g., as shown in a screen such as FIG. 5), or the system could be configured to proceed with a recommended course of action automatically. In either case, this would result in the system automatically calling out to the staff on the list (through email, voice mail or short message) and providing an offer to work at the dynamically calculated wage rate.

Figure 6:
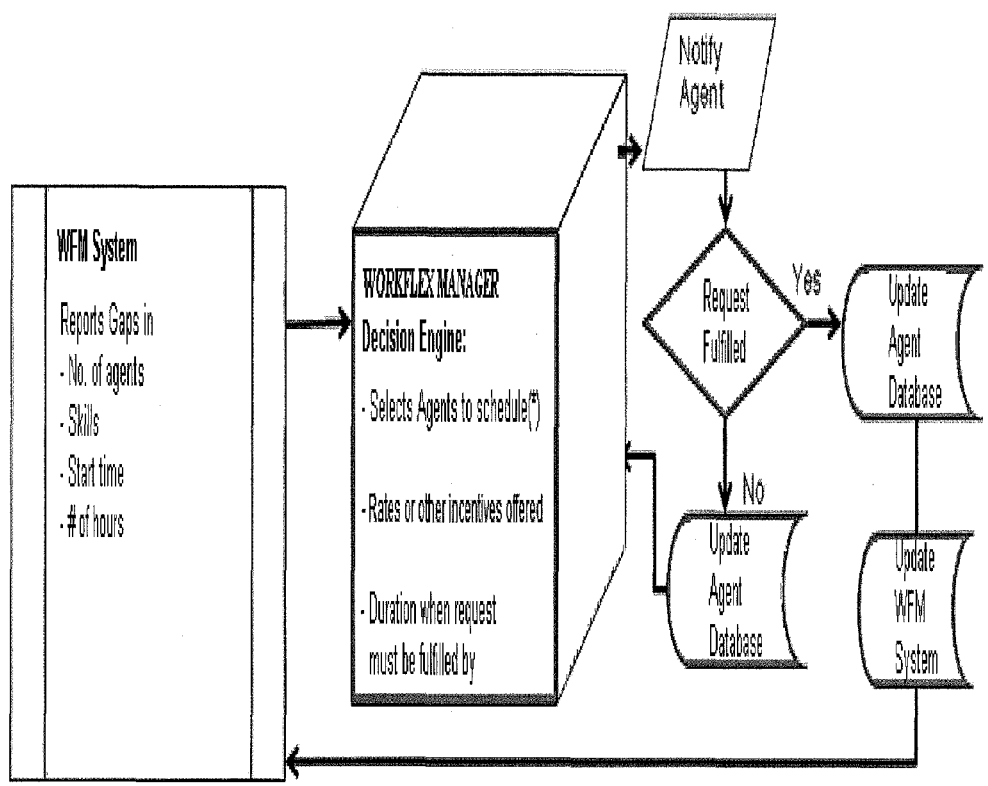
FIG. 6 depicts an exemplary process flow.

FIG. 6 illustrates a process flow (which could be either administrator initiated or self-schedule) which could be implemented using the disclosed technology. The technology disclosed herein, when used in support of process flows as shown in FIG. 6 or otherwise, can be implemented to provide a number of beneficial features (one or more of which may be present in various embodiments), including:

The ability to predefine business rules for intraday staffing;

The ability to calculate optimum wage offers to achieve desired acceptance rate;

The ability for the system to automatically act (e.g., by calling out agents) when a trigger for action is detected;

The ability for agents to self-schedule (e.g., initiating a request) and get a response including a dynamic wage offer; and The ability to make a dynamic wage offer based on business rules and historic success rate data.

As will be immediately apparent to one of ordinary skill in the art, the disclosed technology could be beneficially employed in a broad variety of scenarios, and would be particularly useful in business environments having one or more of the following attributes:

1) Large workforce with common assignment types
2) Variations in demand that are not always predictable
3) Variations in workforce supply that are not always predictable
4) Business sensitivity to intraday gas between workforce supply and demand.
5) Compliance Factors (e.g., labor agreement, overtime rules, seniority guidelines . . . )

Such environments include:

Contact Center Agents (either in-house our outsourced), which is generally characterized by a large hourly workforce, with forecasting capability generally no better that +/−10%. In this application, common business rules attributes could include Agent Proficiency, Overtime Hours Worked, On Call Availability, Time Zone, and Base Wage Rate.

Tech Service Dispatch (e.g., Cable, Telephone, Electric, Heating, Plumbing . . . ) In this application, common business rules attributes could include technical certification, seniority, overtime hours worked, on call availability and proximity to job site.

Health Care Workers (e.g., RN's, Emergency Room staff, Support Staff). In this application, common business rule attributes could include overtime hours worked, on-call availability, and proximity to work site.

Restaurant/Hotel/Hospitality (e.g., Service, Kitchen, Maintenance Staff). This application segment could include a single location (e.g., Large hotel), or multiple locations e.g., fast food chain). In this application, common business rules attributes could include overtime hours worked, on call availability and proximity to job site.

Of course, it should be understood that, while the disclosure set forth above focused primarily on addressing intra-day staffing gaps through the automatic generation of a call out list of agents to whom dynamic wage offers should be sent, the inventors' technology can also be used to provide other incentives in response to detecting other types of staffing gaps. For example, the inventors' technology could be used to implement a system which could allow a user to define business rules specifying other types of responses to detected staffing gaps—such as sending requests that individuals who have been assigned to work during a shift agree to cancel the shift, or to come in late, as a way of addressing a situation during which an updated projection indicates that the actual demand during a shift is likely to be less than was expected at the time the work assignments for that shift were made. Other types of responses (e.g., requesting workers to extend their hours, requesting workers to work on training instead of their normal work responsibilities, etc.) could also be supported using the disclosed technology, and so the discussion of dynamically determining intra-day wage offers should be understood as being illustrative only, and should not be treated as limiting.

Additionally, just as the disclosed technology could be used to support other types of responses than dynamic wage offers and to deal with other types of staffing gaps than those created when actual demand exceeds that which was projected at the time of schedule creation, the disclosed technology could also be used to support different types of workflows than the administrator or system triggered workflows described in the context of dynamic wage offers. To illustrate, consider FIG. 8, which shows an interface which could be used to support worker initiated schedule changes. In that figure, a calendar [801] is displayed, indicating time slots during which a worker is scheduled to work and which could not be removed from his or her schedule, which time slots during which the worker is scheduled to work which could potentially be removed from his or her schedule, and which slots during which the worker was not currently scheduled to work which could potentially be added to the worker's schedule. Such an interface could not only provide information on which slots were potentially subject to change, but could also allow a user to make those changes, such as by dragging and dropping work hours from a slot which could potentially be removed from the workers schedule to a slot which could potentially be added to a worker's schedule; by selecting a slot which could be added to a worker's schedule and a slot which could be removed from a worker's schedule, then activating an exchange button; or in some other manner. In this way, the worker would know which schedule changes were possible and could make them himself or herself, rather than being forced to guess what changes were permissible and waiting for approval from a manager before the change would actually be made.

In an interface such as shown in FIG. 8, the determination of which slots should be included in which class (e.g., potential to be added to schedule, potential to be removed from schedule, required to remain on schedule and, though not shown in FIG. 8, required to remain off the schedule) could, like requests to take action to address a staffing gap, be made on a personalized basis for individual workers.

To illustrate, consider the situation where an updated demand projection indicated that demand for Spanish speaking agents would be higher than expected from 8:00 pm to 10:00 pm, but lower than expected between 4:00 pm and 6:00 pm. In this situation, if a worker who had the ability to speak Spanish and was scheduled to work between 4:00 pm and 6:00 pm but not between 8:00 pm and 10:00 pm requested access to a schedule change interface (e.g., through an internal website which would require the worker to identify and validate himself or herself before being granted access), then the system could present that worker with a version of the interface of FIG. 8 which indicated that the slot between 4:00 pm and 6:00 pm could be removed from the worker's schedule, and that the slot between 8:00 pm and 10:00 pm could be added to the worker's schedule. By contrast, if a worker with a similar schedule but different skills wished to make a change, he or she could be provided with a version of the interface of FIG. 8 which would not indicate that an exchange of the 4:00-6:00 slot for the 8:00-10:00 slot was possible (or allow such a change to be made if the worker requested it nevertheless).

Figure 9:
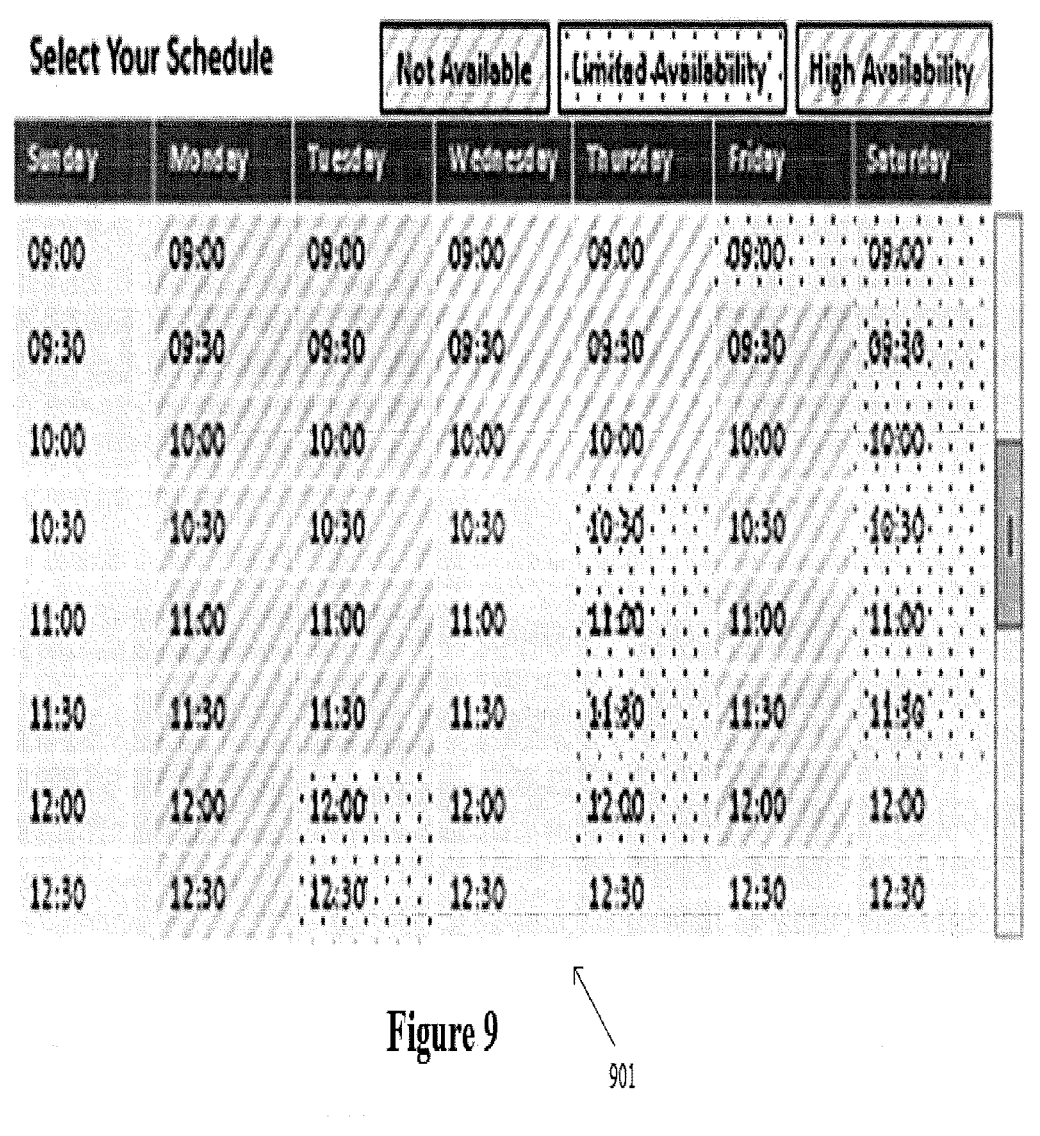

A self-scheduling approach such as described in the context of FIG. 8 could be used to allow workers to make schedule modifications other than just exchanging scheduled for unscheduled times. To illustrate, consider FIG. 9, which depicts an interface which a worker could use to fill in his or her work schedule. In that figure, a partial schedule calendar [901] is depicted showing slots which a worker is already scheduled to work (e.g., Wednesday at 12:00), and which slots a worker is not scheduled to work, with slots the worker is not scheduled to work depicted differently depending on whether they are available to be added to the worker's schedule. Using this type of interface, it is possible that a worker could have part of their schedule filled in using conventional methods (e.g., 20 hours out of a 40 hour week being pre-scheduled based on projections from a workforce management system) but given the freedom to fill in the remainder of their schedule in the manner which is most convenient for them by selecting the available slots from the interface of FIG. 9. Additionally, as shown in FIG. 9, to facilitate this type of schedule completion, a worker could be provided with information on relative availability of different slots, which relative availability information could translate into restrictions on the ability of the worker to select slots to fill in his or her schedule. For example, it is possible that, while the worker could be allowed to add as many high availability slots as he or she desires (up to the number of hours he or she had been allocated) he or she could be prevented from, or required to get managerial approval for, adding more than a threshold amount of limited availability slots during the period being scheduled.

Additionally, just as business rules and related business information (e.g., updated demand information, worker information from a staff database, urgency and other thresholds as defined by a business user, etc) could be used to generate personalized versions of interfaces as shown in FIGS. 8 and 9, it is possible that similar information could be used to update those interfaces after they have initially been generated. To illustrate, consider the example of a call center worker who is using an interface such as shown in FIG. 9 to complete his or her schedule. In this case, the interface presented to the call center worker could initially indicate that Thursday at 10:00 am is a high availability slot. However, it is possible that, after the interface is presented to the worker, a sufficient number of other call center workers with similar skills could add the Thursday 10:00 am slot to their schedules to push the difference between the scheduled demand for that slot and the number of workers scheduled for that slot below the threshold separating high availability slots from limited availability slots. In such a case, a message could be pushed to the device the user was using to view the interface of FIG. 9 which updates that interface to show that the Thursday 10:00 am slot had transitioned from high to limited or no availability.

Where this type of updating is supported, it could be implemented in a variety of ways. For example, a system using the disclosed technology could be implemented to periodically (e.g., every 15 minutes) review information such as changes in employee scheduling and demand projections for a workforce management system, and to push updates to interfaces such as shown in FIGS. 8 and 9 as necessary based on how that information had changed since the interface was generated or last updated. Similarly, it is possible that updates could be made in real time, to avoid a situation in which there is a time lag between an actual change in availability and when such a change would be propagated to interfaces such as shown in FIGS. 8 and 9. It is also possible to address issues related to time lags related to availability changes in ways other than real time updating. For example, when a user requests an interface such as shown in FIGS. 8 and 9, the request could be treated as a request for permission to access a database with both read and write permissions, and handled with the types of concurrency controls (e.g. locking of records) such as are commonly used in existing multi-user databases. Of course, just as personalization can be driven by business rules and related data, a similar approach could be used to control updating. For example, a user could define business rules which would cause an update to be pushed to user devices when a change of sufficient magnitude had taken place since the last update, or periodically on a schedule if no such changes had taken place. Accordingly, the specific updating approaches described above in the context of FIGS. 8 and 9 should be understood as being illustrative only, and should not be treated as implying limitations on the scope of protection provided by this document or any related document.

Similarly, just as variations are possible in how interfaces such as shown in FIGS. 8 and 9 can be updated, variations are also possible on the basic information presented through, and the schedule changes which can be made through, self scheduling interfaces implemented using the disclosed technology. As an example of this type of variation, consider availability data such as shown in FIG. 8. While splitting slots which can be used in schedule changes into those which are available for a change and those which are not such as shown in FIG. 8 could allow a user to identify and initiate schedule changes, it is also possible that, rather than splitting slots into broad categories of "available" and "not available", the disclosed technology could also provide more fine grained information (potentially including actual discrepancies between demand projections and scheduled workers). This provision of more fine grained information could, in turn, allow a worker more flexibility in creating or modifying his or her schedule. For example, rather than only permitting a worker to remove a slot from his or her schedule if the need for labor in that slot was lower than the need for labor in all slots which could be added to the worker's schedule, it is possible that a worker could be allowed to remove any slot from his or her schedule as long as he or she replaced it with a slot with a higher relative need for labor. Of course, variations on this general theme, such as only allowing changes between slots having a relative need differential greater than a threshold amount, or providing a larger number of availability categories than simply "available" or "not available" and allowing removal of any slot as long as it was replaced with a slot from an availability category representing a higher labor need, are also possible, and could be implemented without undue experimentation by those of ordinary skill based on this disclosure.

It is also possible that employee initiated schedule changes such as discussed in the context of FIGS. 8 and 9 could be modified by combining them with other concepts described in the context of employer initiated intra-day schedule changes. For example, just as the disclosed technology can be used to increase the likelihood of success for employer initiated intra-day schedule changes via incentives in personalized offers, it is possible that similar incentives could be provided via interfaces such as shown in FIGS. 8 and 9 to induce workers make changes adding slots with relatively higher labor needs to their schedules. For instance, rules could be created which would provide workers with some kind of reward (e.g., paid time off, a wage bonus, etc) if they make a threshold number of schedule changes in a given period, or if they make schedule changes which collectively reduce the differential between labor need and labor allocation by at least a threshold amount. Where such inducements are provided, interfaces such as shown in FIGS. 8 and 9 could be modified to indicate the availability and/or requirements for such inducements.

Similarly, self-scheduling interfaces such as shown in FIGS. 8 and 9 could also be integrated with implementations in which personalized offers are provided only to workers (or potential workers) included in a dynamically created optimized call out list. For example, when an optimized call out list is created in response to identifying a staffing gap, it is possible that a message could be pushed to the workers on that call out list informing them of an available reward, and indicating that they should access the schedule change interface in order to make the schedule changes necessary to obtain that reward. In this manner, it is possible that both employer and employee instigated schedule changes could be driven through a single interface, thereby reducing the difficulty (and increasing the likelihood of) beneficial schedule changes being made.

Of course, it should be understood that, while the description of scheduling in the context of FIGS. 8 and 9 focused primarily on examples in which workers would know in advance what changes to their schedules would be approved, self-scheduling could also be implemented through workflows in which additional analysis might be necessary for some (or all) requested changes. For example, in a case where there could be changes in slot availability between the time an interface is presented to a worker and the time a worker makes a request for a schedule change (e.g., where a self-scheduling interface is updated on a periodic basis), it is possible that slots could be categorized according to the likelihood that staffing gaps associated with those slots would be resolved between updates. In such a case, if a worker requested a schedule change involving a slot associated with a staffing gap with a likelihood of being resolved between updates which was greater than a threshold level, then before that change would be made, a further check (which could be automated or manual) could be made to ensure that the staffing gap had not been resolved, and the request could be denied (and the worker could be informed of such denial) if the staffing gap no longer existed at the time the request for a change was made. Similarly, rules could be created which would require that, before some changes (e.g., those between slots having needs which were relatively similar, or which had staffing gaps with absolute magnitudes below a user defined thresholds) could be made, they would have to be submitted to a human reviewer for approval.

Additional variations not explicitly described herein will be immediately apparent to, and could be implemented by those of ordinary skill in the art in light of, this disclosure. Accordingly, instead of limiting the protection accorded by this document, or by any document which is related to this document, to the material explicitly disclosed herein, the protection should be understood to be defined by the following claims, which are drafted to reflect the scope of protection sought by the inventors in this document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to the claims based on the above disclosure or the incorporated priority documents is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

EXPLICIT DEFINITIONS

When used in the claims, a statement that something is "based on" something else should be understood to mean that something is determined at least in part by the thing that it is indicated as being "based on." When something is completely determined by a thing, it will be described as being "based EXCLUSIVELY on" the thing.

When used in the claims, "cardinality" should be understood to refer to the number of elements in a set.

When used in the claims, "computer" should be understood to refer to a device, or group of devices, which is capable of performing one or more logical and/or physical operations on data to produce a result. Non-limiting examples of "computers" include servers, laptops, desktops, netbooks, and notebooks, as well as handheld devices such as cellular phones, personal digital assistants, and portable game consoles.

When used in the claims, "computer executable instructions" should be understood to refer to data which can be used to specify physical or logical operations which can be performed by a computer.

When used in the claims, "computer readable medium" should be understood to refer to any object, substance, or combination of objects or substances, capable of storing data or instructions in a form in which they can be retrieved and/or processed by a device. A computer readable medium should not be limited to any particular type or organization, and should be understood to include distributed and decentralized systems however they are physically or logically disposed, as well as storage objects of systems which are located in a defined and/or circumscribed physical and/or logical space. Computer memory such as hard discs, read only memory, random access memory, solid state memory elements, optical discs and registers is an example of a "computer readable medium."

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft WORD on a computer "configures" that computer to function as a word processor, which it does by using the instructions for Microsoft WORD in combination with other inputs, such as an operating system, and various peripherals (e.g., a keyboard, monitor, etc).

When used in the claims, "database" should be understood to be to a collection of data stored on a computer readable medium in a manner such that the data can be retrieved by a computer. The term "database" can also be used to refer to the computer readable medium itself (e.g., a physical object which stores the data).

When used in the claims, the verb "display" refers to the act of providing the thing "displayed" in a visually perceptible form. It should be understood that, in the context of this disclosure, "displaying" refers not only to actually physically presenting a thing on a screen, but also to causing that thing to be presented (e.g., by sending instructions from a local CPU, or by sending information over a network which causes a thing to be "displayed").

When used in the claims, an "element" of a "set" (defined infra) should be understood to refer to one of the things in the "set."

When used in the claims, "remote" should be understood to refer to the relationship between entities which are physically distant from one another, such as between entities that communicate over a network.

When used in the claims, the term "set" should be understood to refer to a number, group, or combination of zero or more things of similar nature, design, or function.

When used in the claims, the term "storing" used in the context of a memory or computer readable medium should be understood to mean that the thing "stored" is reflected in one or more physical properties (e.g., magnetic moment, electric potential, optical reflectivity, etc) of the thing doing the "storing" for a period of time, however brief.

When used in the claims, "workforce management system" should be understood to refer to a system used to manage the scheduling or activities of agents. An example of a system which would be treated as a "workforce management system" as that phrase is used in the claims is an automatic call distribution system.

Accordingly, we claim:

1. A method for allowing staff members to submit schedule modification requests using a schedule modification interface which indicates information which would be used to determine whether to automatically accept or deny those requests, the method comprising a set of tasks performed by a computer, the set of tasks comprising:
   a) obtaining updated demand information, wherein the updated demand information comprises, for at least one future time period from a plurality of future time periods covered by a schedule for a staff member, an updated projection of demand for work by the staff member during that future time period, wherein the updated projection of demand for work is more recent than a previous projection of demand for work used to generate the schedule for the staff member, and wherein the plurality of future time periods covered by the schedule for the staff member includes both time periods during which the staff member is scheduled to work and time periods during which the staff member is not scheduled to work, wherein demand for work is demand for work for an employer;
   b) based on a most recent projection of demand for work by the staff member, determining, for each of one or more future time periods from the plurality of time periods covered by the schedule for the staff member, the future time period's suitability for a schedule change by the staff member, wherein, for each of the one or more future time periods from the plurality of time periods covered by the schedule for the staff member, determining the future time period's suitability for a schedule change by the staff member comprises:
 i) determining which rules from a set of rules specified by the employer for evaluating potential schedule changes should be applied to evaluate contemporaneous schedule modification requests for the staff member: and
 ii) applying the rules for evaluating contemporaneous schedule modification requests from the staff member with information corresponding to parameters specified in the rules using a rules engine;
c) allowing the staff member to know, in advance of submitting a schedule change request, whether that schedule change request will be automatically accepted or denied by generating, in response to an interface request from a remote computing device associated with the staff member, a set of data operable to configure the remote computing device associated with the staff member to present the schedule modification interface, wherein the schedule modification interface indicates the suitability of each of the one or more future time periods for a change in the staff member's schedule as determined by the computer based on the most recent projection of demand for work by the staff member;
d) receiving, via the schedule modification interface, a request for a change in the staff member's schedule; and
e) automatically, by a processor, processing the request for the change in the staff member's schedule by performing one or more acts comprising:
 i) based on the suitability for a schedule change, as determined by the computer based on the most recent projection of demand for work by the staff member, of one or more future time periods indicated in the request for the change in the staff member's schedule, determining whether to automatically, by the processor, accept or deny the request for the change in the staff member's schedule; and
 ii) when the request for the change in the staff member's schedule is accepted, modifying data used to generate updated demand projections for other staff members to include the requested change in the staff member's schedule;
wherein the computer is configured with instructions operable to cause it to, between receiving the interface request and the request for the change in the staff member's schedule:
A) obtain updated information corresponding to parameters in the rules specified by the employer for evaluating potential schedule changes;
B) repeat the step of, for each of the one or more future time periods, determining the future time period's suitability for a schedule change by the staff member using the then most recent projection of demand for work by the staff member and the updated information corresponding to parameters in the rules specified by the employer for evaluating potential schedule changes; and
C) selectively, based on concurrency controls and a most recent determination of the suitability for a change in the staff member's schedule of each of the one or more future time periods, sending interface update data to the remote computing device associated with the staff member, the interface update data operable to update the schedule modification interface to indicate the most recently determined suitability of each of the one or more future time periods for a change in the staff member's schedule.

2. The method of claim 1, wherein;
a) the schedule modification interface:
 i) comprises a grid with slots corresponding to each of the one or more future time periods;
 ii) is operable by the staff member in response to whose request the set of data operable to configure the remote computing device to present the schedule modification interface was generated through manipulation of one or more corresponding slots to identify the one or more future time periods to be indicated in the request for the change in the staff member's schedule; and
 iii) indicates:
  I) for each of the one or more future time periods, whether the staff member in response to whose request the set of data operable to configure the remote computing device to present the schedule modification interface is generated is scheduled to work during that future time period;
  II) for each of one or more future time periods during which the staff member in response to whose request the set of data operable to configure the remote computing device to present the schedule modification interface is generated is scheduled to work, the future time period's suitability for being changed from a period during which that staff member is scheduled to work to a period during which that staff member is not scheduled to work; and
  III) for each of one or more future time periods during which the staff member in response to whose request the set of data operable to configure the remote computing device to present the schedule modification interface is generated is not scheduled to work, the future time period's suitability for being changed from a period during which that staff member is not scheduled to work to a period during which that staff member is scheduled to work; and
b) the request for the change in the staff member's schedule comprises an indication of an assigned future time period during which the staff member is scheduled to work and an indication of an unassigned future time period the staff member is not scheduled to work.

3. The method of claim 1, wherein:
a) the request for the change in the staff member's schedule comprises an indication of an assigned future time period during which the staff member is scheduled to work and an indication of an unassigned future time period the staff member is not scheduled to work; and
b) automatically processing the request for the change in the staff member's schedule comprises automatically accepting the request for the change in the schedule of the staff member if and only if a most recent projection of demand for work by the staff member during the unassigned future time period is greater than a most recent projection of demand for work by the staff member during the assigned future time period.

4. The method of claim 3, wherein the method further comprises:
a) offering the staff member a benefit the staff member is not otherwise entitled to as an incentive to use the schedule modification interface;
b) automatically accepting the request for the change in the schedule of the staff member; and c) based on receiving the request for the change in the schedule of the staff member, providing the benefit to the staff member.

5. The method of claim 3, wherein determining whether to automatically accept or deny the request for the change in the staff member's schedule consists of determining to automatically accept the request for the change in the staff member's schedule based on the most recent projection of demand for work by the staff member during the unassigned future time period being greater than the most recent projection of demand for work by the staff member during the assigned future time period.

6. The method of claim 1, wherein the determination for each of one or more future time periods, of the future time period's suitability for a schedule change is a personalized determination based on staff data corresponding to the staff member for whom the determination is made.

7. The method of claim 1, wherein the method comprises, after determining whether to automatically accept or deny the request for the change in the staff member's schedule, routing the request for the change in the staff member's schedule to a human reviewer for acceptance or denial based on the request for the change in the staff member's schedule indicating a future time period having a suitability for a schedule change by the staff member being below a threshold for automatic acceptance.

8. The method of claim 1, wherein "projection of demand for work" means a quantity of labor expected to be needed at a future time.

9. The method of claim 8, wherein:
a) the request for the change in the staff member's schedule comprises an indication of an assigned future time period during which the staff member is scheduled to work and an indication of an unassigned future time period the staff member is not scheduled to work; and
b) the determination of whether to automatically accept or deny the request for the change in the staff member's schedule is made based on comparing relative projections of demand for work to be performed by the staff member during the time periods indicated in the request for the change in the staff member's schedule.

10. A system for allowing staff members to submit schedule modification requests using a schedule modification interface which indicates information which would be used to determine whether to automatically accept or deny those requests, the system comprising:
a) a workforce management system;
b) a computing device associated with a staff member;
c) a computer, the computer located remotely from the computing device associated with the staff member and configured to perform a set of tasks comprising:
i) obtaining updated demand information from the workforce management system, wherein the updated demand information comprises, for at least one future time period from a plurality of future time periods covered by a schedule for the staff member, an updated projection of demand for work by the staff member during that future time period, wherein the updated projection of demand for work is more recent than a previous projection of demand for work used to generate the schedule for the staff member, and wherein the plurality of future time periods covered by the schedule for the staff member includes both time periods during which the staff member is scheduled to work and time periods during which the staff member is not scheduled to work, wherein demand for work is demand for work for an employer;
ii) based on a most recent projection of demand for work by the staff member, determining, for each of one or more future time periods from the plurality of time periods covered by the schedule for the staff member, the future time period's suitability for a schedule change by the staff member, wherein, for each of the one or more future time periods from the plurality of future time periods covered by the schedule for the staff member, determining the future time period's suitability for a schedule change by the staff member comprises:
I) determining which rules from a set of rules specified by the employer for evaluating potential schedule changes should be applied to evaluate contemporaneous schedule modification requests for the staff member; and
II) applying the rules for evaluating contemporaneous schedule modification requests from the staff member with information corresponding to parameters specified in the rules using a rules engine;
iii) allowing the staff member to know, in advance of submitting a schedule change request, whether that schedule change request will be automatically accepted or denied by, if an interface request is received from the computing device associated with the staff member, generating a set of data operable to configure the computing device associated with the staff member to present the schedule modification interface, wherein the schedule modification interface indicates suitability of each of the one or more future time periods for a change in the staff member's schedule as determined by the computer based on the most recent projection of demand for work by the staff member;
iv) if a request for a change to the staff member's schedule is received, automatically processing, by a processor comprised by the computer, the request for the change in the staff member's schedule by performing one or more acts comprising:
I) based on the suitability for a schedule change, as determined by the computer based on the most recent projection of demand for work by the staff member, of one or more future time periods indicated in the request for the change in the staff member's schedule, determining whether to automatically, by the processor comprised by the computer, accept or deny the request for the change in the staff member's schedule; and
II) when the request for the change in the staff member's schedule is accepted, modifying data used to generate updated demand projections for other staff members to include the requested change in the staff member's schedule;
v) between receiving the interface request and the request for the change in the staff member's schedule:
I) obtain updated information corresponding to parameters in the rules specified by the employer for evaluating potential schedule changes;
II) repeat the step of, for each of the one or more future time periods, determining the future time period's suitability for a schedule change by the staff member using the then most recent projection of demand for work by the staff member and the updated information corresponding to parameters in the rules specified by the employer for evaluating potential schedule changes; and III) selectively, based on concurrency controls and a most recent determination of the suitability for a change in the staff member's schedule of each of the one or more future time periods, sending interface update data to the remote computing device associated with the staff member, the interface update data operable to update the schedule modification interface to indicate the most recently determined suitability of each of the one or more future time periods for a change in the staff member's schedule.

11. The system of claim 10, wherein:
a) the schedule modification interface:
   i) comprises a grid with slots corresponding to each of the one or more future time periods;
   ii) is operable by the staff member through manipulation of one or more corresponding slots to identify the one or more future time periods to be indicated in the request for the change in the staff member's schedule; and
   iii) indicates:
      I) for each of one or more future time periods during which the staff member is scheduled to work, the future time period's suitability for being changed from a period during which the staff member is scheduled to work to a period during which the staff member is not scheduled to work; and
      II) for each of one or more future time periods during which the staff member is not scheduled to work, the future time period's suitability for being changed from a period during which the staff member is not scheduled to work to a period during which the staff member is scheduled to work; and
b) the request for the change in the staff member's schedule comprises an indication of an assigned future time period during which the staff member is scheduled to work and an indication of an unassigned future time period the staff member is not scheduled to work.

12. The system of claim 10, wherein:
a) the request for the change in the staff member's schedule comprises an indication of an assigned future time period during which the staff member is scheduled to work and an indication of an unassigned future time period the staff member is not scheduled to work; and
b) the computer is configured to automatically accept the request for the change in the staff member's schedule only if a demand for work by the staff member during the unassigned future time period is greater than a demand for work by the staff member during the assigned future time period.

13. The system of claim 10, wherein the determination for each of one or more future time periods, of the future time period's suitability for a schedule change is a personalized determination based on staff data corresponding to the staff member for whom the determination is made.

14. A method comprising a set of tasks performed by a computer, the set of tasks comprising:
a) generating a schedule for a staff member, wherein:
   i) the schedule comprises a time span covering a plurality of future time periods;
   ii) the schedule is generated based on demand information comprising, for each future time period from the plurality of future time periods, a projection of demand for work by the staff member during that future time period; and
   iii) the schedule comprises a plurality of assignments the staff member is contractually required to perform for an employer;
b) obtaining updated demand information, wherein the updated demand information comprises, for at least one future time period from the plurality of future time periods, an updated projection of demand for work by the staff member during that future time period;
c) determining, for each future time period from the plurality of future time periods, that future time period's suitability for a change in the schedule of the staff member based on a most recent projection of demand for work by the staff member during that future time period, wherein, for each of the one or more future time periods from the plurality of future time, determining that future time period's suitability for a schedule change by the staff member comprises:
   i) determining which rules from a set of rules specified by the employer for evaluating potential schedule changes should be applied to evaluate contemporaneous schedule modification requests for the staff member; and
   ii) applying the rules for evaluating contemporaneous schedule modification requests from the staff member with information corresponding to parameters specified in the rules using a rules engine;
d) allowing the staff member to know, in advance of submitting a schedule change request, whether that schedule change request will be automatically accepted or denied by generating, in response to an interface request from the a remote computing device associated with the staff member, a set of data operable to configure the remote computing device associated with the staff member to present a schedule modification interface, wherein:
   i) the schedule modification interface indicates, for each future time period from the plurality of future time periods, that future time period's suitability for a change in the schedule of the staff member as determined by the computer based on the most recent projection of demand for work by the staff member; and
   ii) the schedule modification interface is operable by the staff member to request one or more changes in the schedule of the staff member;
e) receiving, via the schedule modification interface, a request for a change in the schedule of the staff member, wherein the request for the change in the schedule of the staff member indicates one or more future time periods from the plurality of future time periods;
f) determining whether to automatically accept or deny the request for the change in the schedule of the staff member based on, for each future time period from the one or more future time periods indicated in the request for the change in the schedule of the staff member, that future time period's suitability for a schedule change as determined by the computer based on the most recent projection of demand for work by the staff member; and
g) when the request for the change in the schedule of the staff member is accepted, modifying data used to generate updated demand projections for other staff members to include the requested change in the staff member's schedule;
wherein the computer is configured with instructions operable to cause it to, between receiving the interface request and the request for the change in the staff member's schedule:

A) obtain updated information corresponding to parameters in the rules specified by the employer for evaluating potential schedule changes;
B) repeat the step of, for each of the one or more future time periods, determining that future time period's suitability for a schedule change by the staff member using the then most recent projection of demand for work by the staff member and the updated information corresponding to parameters in the rules specified by the employer for evaluating potential schedule changes; and
C) selectively, based on concurrency controls and a most recent determination of the suitability for a change in the staff member's schedule of each of the one or more future time periods, sending interface update data to the remote computing device associated with the staff member, the interface update data operable to update the schedule modification interface to indicate the most recently determined suitability of each of the one or more future time periods for a change in the staff member's schedule.

15. The method of claim 14, wherein:
a) the schedule modification interface indicates, for each future time period from the plurality of future time periods:
    i) whether the schedule of the staff member comprises an assignment for the staff member to work during that future time period;
    ii) if the schedule of the staff member comprises an assignment for that future time period, whether the assignment for that future time period can be removed from the schedule of the staff member; and
    iii) if the schedule of the staff member does not comprise an assignment for that future time period, whether an assignment for that future time period can be added to the schedule of the staff member;
b) the one or more future time periods from the plurality of future time periods indicated in the request for the change in the schedule of the staff member comprises:
    i) an unassigned future time period, wherein the schedule of the staff member does not comprise an assignment for the staff member to work during the unassigned future time period; and
    ii) an assigned future time period, wherein the schedule of the staff member comprises an assignment for the staff member to work during the assigned future time period;
c) automatically accepting the request for the change in the schedule of the staff member is performed by:
    i) adding an assignment for the staff member to work during the unassigned future time period to the schedule of the staff member; and
    ii) removing the assignment for the staff member to work during the assigned future time period from the schedule of the staff member.

16. The method of claim 14, wherein:
a) the schedule modification interface indicates, for each future time period from the one or more future time periods, that future time period's suitability for a change in the schedule of the staff member;
b) the one or more future time periods from the plurality of future time periods indicated in the request for the change in the schedule of the staff member comprises:
    i) an unassigned future time period, wherein the schedule of the staff member does not comprise an assignment for the staff member to work during the unassigned future time period; and
    ii) an assigned future time period, wherein the schedule of the staff member comprises an assignment for the staff member to work during the assigned future time period;
c) the method comprises automatically accepting the request for the change in the schedule of the staff member if and only if a need for work by the staff member during the unassigned future time period is greater than a need for work by the staff member during the assigned time period.

17. The method of claim 14, wherein
a) the method further comprises:
    i) offering the staff member a benefit the staff member is not otherwise entitled to as an incentive to use the schedule modification interface;
    ii) automatically accepting the request for the change in the schedule of the staff member; and
    iii) based on receiving the request for the change in the schedule of the staff member, providing the benefit to the staff member;
b) the one or more future time periods from the plurality of future time periods indicated in the request for the change in the schedule of the staff member comprises:
    i) an unassigned future time period, wherein the schedule of the staff member does not comprise an assignment for the staff member to work during the unassigned future time period; and
    ii) an assigned future time period, wherein the schedule of the staff member comprises an assignment for the staff member to work during the assigned future time period; and
c) automatically accepting the request for the change in the schedule of the staff member is performed by:
    i) adding an assignment for the staff member to work during the unassigned future time period to the schedule of the staff member; and
    ii) removing the assignment for the staff member to work during the assigned future time period from the schedule of the staff member.

* * * * *